3,832,352
2-(THI)OXO-3-IMIDAZOLYL(2)-
TETRAHYDROIMIDAZOLES
Atso Ilvespää, Neuallschwil, Switzerland, assignor to
Ciba-Geigy Corporation, Ardsley, N.Y.
No Drawing. Filed May 2, 1972, Ser. No. 249,598
Claims priority, application Switzerland, May 3, 1971,
6,467/71; Nov. 3, 1971, 15,983/71; Feb. 8, 1972,
1,808/72
Int. Cl. C07d 49/36
U.S. Cl. 260—309.7          10 Claims

ABSTRACT OF THE DISCLOSURE

The present invention relates to nitro-imidazoles of the formula I

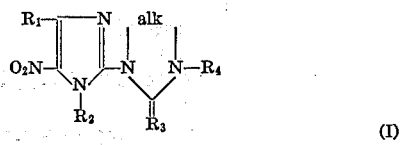

wherein $R_1$ is hydrogen or lower alkyl, $R_2$ is lower alkyl or hydroxy-lower alkyl, $R_3$ is oxo or thioxo, $R_4$ is hydrogen, lower alkyl, lower alkanoyl or the group

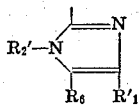

wherein $R_1'$ and $R_2'$ are the same as $R_1$ and $R_2$ and $R_6$ is nitro, and alk is 1,2-ethylene, 1,2-propylene, 2,3-butylene or 2-methyl-1,2-propylene group, or a physiologically tolerable salt thereof, which are suitable for treating Gram-negative bacteria, protozoa and worms.

---

The present invention relates to imidazoles of the formula I

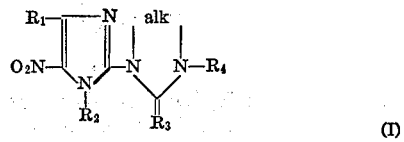

wherein $R_1$ is a hydrogen atom or a lower alkyl group, $R_2$ is a hydrogen atom or a lower alkyl, hydroxy-lower alkyl, lower alkoxy-lower alkyl, lower alkylsulphonyl-lower alkyl or amino-lower alkyl group, $R_3$ is an oxo or thioxo group, $R_4$ is a hydrogen atom or a lower alkyl, hydroxy-lower alkyl, lower alkoxy-lower alkyl, amino-lower alkyl or acyl group or an unsubstituted or substituted 2-imidazolyl group and alk is a lower alkylene group.

An unsubstituted or substituted 2-imidazolyl group is in particular, the group

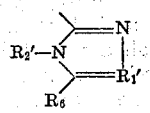

wherein $R_1'$ is the same as $R_1$, $R_2'$ is the same as $R_2$ and $R_6$ is a hydrogen atom or a lower alkyl or nitro group.

Here and throughout the specification, "lower" radicals are radicals with up to 7 carbon atoms, especially those with up to 4 carbon atoms.

A lower alkyl group is, for example, an ethyl, n-propyl, i-propyl, straight or branched chain butyl, pentyl, hexyl or heptyl group bonded in any desired position, or, especially, a methyl group.

A hydroxy-lower alkyl group is, for example, a lower alkyl group mentioned above which carries a hydroxyl group, for example, a hydroxy-methyl, 2-hydroxy-n-propyl, 3-hydroxy-n-propyl group or especially a 2-hydroxy-ethyl group, it also being possible for several, especially two, hydroxyl groups to be present, such as, for example, 2,3-dihydroxy-n-propyl.

A lower alkoxy-lower alkyl group is, for example, a lower alkyl group mentioned above which carries a lower alkoxy group and wherein the lower alkyl part has the above meanings, for example, 2-methoxy-n-propyl, 3-methoxy-n-propyl or especially 2-ethoxy-ethyl, 2-methoxy-ethyl or methoxymethyl.

A lower alkylsulphonyl-lower alkyl group is, for example, a lower alkyl group mentioned above which carries a sulphonyl group, wherein the lower alkyl part has the above meanings, for example, a methylsulphonylmethyl, ethylsulphonylmethyl, methylsulphonyl-ethyl, propylsulphonylmethyl, propylsulphonyl - ethyl, propylsulphonylpropyl, or ethylsulphonylethyl group, especially a 2-ethylsulphonylethyl group.

An amino-lower alkyl group $R_2$ is, for example, a lower alkyl group mentioned above which carries an amino group, especially a tertiary amino group. A tertiary amino group is, for example, a di-lower alkylamino group, for example, a dimethylamino, N-methyl-N-ethyl-amino, diethylamino, di-n-propylamino or di-n-butylamino group or a lower alkyleneamino group, wherein the lower alkyl part can also be interrupted by one or more hetero-atoms, for example, an oxa-alkyleneamino, thiaalkyleneamino or aza-alkyleneamino group, for example, a pyrrolidino, piperidino, morpholino, thiomorpholino, 2-6-dimethyl-thiomorpholino, piperazino, N'-methylpiperazino or N'-(β-hydroxyethyl) - piperazino group. An amino-lower alkyl group is accordingly, for example, a dimethylaminomethyl, diethylaminomethyl, 2 - dimethyl - aminoethyl, pyrrolidinomethyl, 2 - pyrrolidino - ethyl, 3-pyrrolidinopropyl, piperidino - methyl, morpholino - methyl, 2-morpholino - ethyl, thiomorpholino - methyl, piperazinomethyl, 2-piperazino-ethyl, N'-methyl-piperazino-methyl, 3 - (N'-methyl - piperazino) - propyl or N' - (β-hydroxyethyl)-piperazino-methyl.

If $R_4$ represents a 2-imidazolyl group substituted by an amino-lower alkyl group in the 1-position, the amino-lower alkyl group $R_2'$ has the same meanings as $R_2$ and can also be a secondary amino group. The amino-lower alkyl group $R_2$ can also optionally be a secondary amino-lower alkyl group.

By way of examples, secondary amino-lower alkyl groups are mono-lower alkylamino-lower alkyl groups, for example, 2-methyl-aminoethyl or 2-ethylaminoethyl groups.

In all the radicals $R_2$ and $R_2'$ which have been mentioned, the amino group in an amino-lower alkyl group is separated from the imidazole nucleus by at least two, and especially by two, carbon atoms.

An acyl group is, for example, an alkanoyl group, especially a lower alkanoyl group, for example, a propionyl or butyryl group or especially an acetyl or formyl group.

A lower alkylene group is a branched or especially a straight-chain lower alkylene group, for example, with 2-4 carbon atoms in the alkylene chain, for example, a 1,2-propylene, 1,2-butylene, 1,2-pentylene, 1,2-hexylene, 2-methyl-1,2-propylene, 2,3-butylene, 1,3-butylene, 1,3-propylene, 1,4-butylene or especially 1,2-ethylene group.

The imadozoles of the innvention possess valuable pharmacological properties. In particular they display effects against bacteria, especially Gram-negative bacteria, protozoa and worms, for example, trichomonades, schistosomes, coccidia, filaria and above all amoebae, as can be shown in animal experiments, for example, on the liver of healthy hamsters artificially infected with Entamoeba histolytica, on administration of doses of from about 30 to about 100 mg./kg. given orally. The imidazoles of the invention are therefore in particular useful as agents against amoebae, schistosomes, filaria, trichomonades and bacteria in warm-blooded animals. Furthermore, the imidazoles of the invention serve as starting products or intermediate products for the manufacture of other compounds, especially therapeutically active compounds.

Amongst the imidazoles of the formula I, there should especially be singled out those wherein $R_1$, $R_2$, $R_3$ and alk have the above meaning and $R_4$ is a hydrogen atom, a lower alkyl, hydroxy-lower alkyl, lower alkoxy-lower alkyl, di-lower alkyl-amino-lower alkyl, lower alkyleneamino-lower alkyl, lower oxa-alkyleneamino-lower alkyl, lower thia-alkyleneamino-lower alkyl, lower aza-alkyleneamino-lower alkyl or lower alkanoyl group.

Further imidazole compounds to be singled out are those of the formula I wherein $R_1$, $R_2$, $R_3$ and alk have the above meanings and $R_4$ is the 2-imidazolyl group

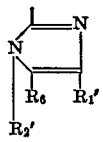

wherein $R_1'$ and $R_2'$ have the above meaning, and $R_6$ is a nitro group.

Especially preferred imidazoles of the formula I are those wherein $R_1$ is a hydrogen atom or a lower alkyl group, $R_2$ is a lower alkyl or hydroxy-lower alkyl group, $R_3$ is an oxo group, $R_4$ is a hydrogen atom, a lower alkyl or lower alkanoyl group and alk is a 1,2-ethylene, 1,2-propylene, 2,3-butylene or 2-methyl-1,2-propylene group and also those compounds of the formula I wherein $R_1$ is a hydrogen atom or a lower alkyl group, $R_2$ is a lower alkyl, hydroxy-lower alkyl, lower alkylsulfphonyl-lower alkyl or tertiary amino-lower alkyl group $R_3$ is an oxo group, $R_4$ is the group

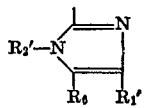

wherein $R_1'$ is a hydrogen atom or a lower alkyl group, $R_2'$ is a lower alkyl-hydroxy-lower alkyl, lower alkylsulphonyl-lower alkyl or tertiary amino-lower alkyl group, $R_6$ is a nitro group and alk is a 1,2-ethylene, 1,2-propylene, 2,3-butylene or 2-methyl-1,2-propylene group.

Further preferred compounds of the invention are those wherein $R_1$ is a hydrogen atom, $R_2$ is a lower alkyl group, $R_3$ is an oxo group, $R_4$ is a hydrogen atom or a lower alkanoyl group and alk is a 1,2-ethylene group, and also imidazoles of the formula I wherein $R_1$ is a hydrogen atom, $R_2$ is a lower alkyl, lower alkyl-sulphonyl-lower alkyl group or a di-lower alkylamino group with 2 carbon atoms or a lower alkyleneamino-lower alkyl group with 2 carbon atoms and wherein the lower alkyl part can also be interrupted by one or more hetero- atoms, $R_3$ is an oxo group, $R_4$ is the group

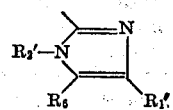

wherein $R_1'$ is a hydrogen atom, $R_2'$ is a lower alkyl, lower alkyl-sulphonyl-lower alkyl, di-lower alkylamino or lower alkylene-amino group, it also being possible for the lower alkyl part to be interrupted by one or more heteroatoms, $R_6$ is a nitro group and alk is a 1,2-ethylene group.

In particular there should be mentioned imidazoles of the formula I wherein $R_1$ is a hydrogen atom, $R_2$ is a lower alkyl, lower alkylsulphonyl-lower alkyl, pyrrolidinoethyl, piperidinoethyl, morpholinoethyl, thiomorpholino- ethyl or piperazinoethyl group, $R_3$ is an oxo group, $R_4$ is the group

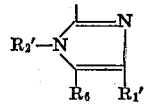

wherein $R_1'$ is a hydrogen atom, $R_2'$ is a lower alkyl, lower alkylsulphonyl-lower alkyl, 2-pyrrolidinoethyl, 2-piperidinoethyl, 2-morpholinoethyl, 2-thiomorpholinoethyl or 2-piperazinoethyl group, $R_6$ is a nitro group and alk is a 1,2-ethylene group.

Amongst these imidazoles of the formula I there should especially be mentioned 1-acetyl-2-oxo-3-[1-methyl-5-nitro-imidazolyl-(2)]-tetrahydroimidazole,
1-formyl-2-oxo-3-[1-methyl-5-nitro-imidazolyl-(2)]-tetrahydroimidazole,
2-oxo-3-[1-methyl-5-nitro-imidazolyl-(2)]-tetrahydroimidazole,
1-acetyl-2-thioxo-3-[1-methyl-5-nitro-imidazolyl-(2)]-tetrahydroimidazole, and
1,3-di[1-methyl-5-nitro-imidazolyl-(2)]-2-oxo-tetrahydroimidazole and very especially 2-oxo-3-[1-methyl-5-nitro-imidazolyl-(2)]-tetrahydroimidazole and 1,3-di[1-methyl - 5 - nitro-imidazolyl-(2)]-2-oxo-tetrahydroimidazole whose use results in freedom from abscess on the liver of healthy hamsters artificially infected with *Entamoeba histolytica*, on administration in doses of from 30 to 100 mg./kg., given orally.

The imidazoles of the invention may be obtained in accordance with methods which are in themselves known for the production of analogous compounds, the term "known" being used here and throughout the specification to mean in actual use in the art or described in the literature of the art.

Thus, for example, the imidazoles of the invention can be obtained if an imidazole of the formula II

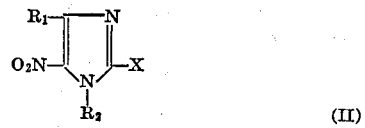

wherein $R_1$ and $R_2$ have the above meaning and X is a reactive esterified hydroxyl group, a reactive etherified hydroxyl group, a free or etherified mercapto group, an ammonium group or a sulphonyl group, is reacted with a compound of the formula III

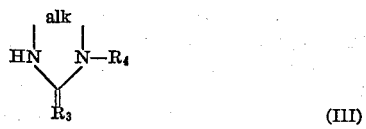

wherein $R_3$, $R_4$ and alk have the above meaning.

A reactive esterified hydroxyl group X is in particular a hydroxyl group esterified by a strong inorganic or organic acid, above all a hydrohalic acid, for example, hydrochloric acid, hydrobromic acid or hydriodic acid, or sulphuric acid or an organic sulphonic acid, for example, an aromatic sulphonic acid, for example, benzenesulphonic acid, p-bromobenzenesulphonic acid or p-toluenesulphonic acid, or an aliphatic sulphonic acid, for example, an alkanesulphonic acid, for example, methanesulphonic acid or ethanesulphonic acid. Thus X in particular represents a chlorine, bromine or iodine atom.

A reactive etherified hydroxyl group is, for example, a hydroxyl group etherified by an aromatic or aliphatic, especially a lower aliphatic, alcohol, for example, unsubstituted or substituted phenoxy group or an alkoxy group, especially a lower alkoxy group, especially a methoxy or ethoxy group.

An etherified mercapto group is, for example, an unsubstituted or substituted phenylmercapto or benzylmercapto group or espeically a lower alkylmercapto group, for example, an ethylmercapto or methylmercapto group.

An ammonium group is, in particular, a quaternary ammonium group, especially a tri-lower alkylammonium group, for example, a trimethylammonium or triethylammonium group, or the cation of an aromatic nitrogen base, for example, the pyridinium or quinolinium group.

A sulphonyl group is, in particular, a sulphonyl group derived from an organic sulphonic acid, especially from an aromatic sulphonic acid. Thus X in particular represents a benzenesulphonyl, p-bromobenzenesulphonyl, p-toluenesulphonyl or methylsulphonyl group.

The reaction can be carried out in the customary manner. Preferably, it is effected in the presence of a basic condensation agent, or the compound of the formula III is employed in the form of its N-metal derivative, for example, its N-alkali metal derivative, which is obtainable, for example, from the compound of the formula III and an amide, hydride, hydrocarbon compound, hydroxide or alcoholate of an alkali metal, for example, lithium, sodium or potassium, and which can be employed without isolation. Suitable basic condensation agents are, for example, alkali metal hydroxides or alkaline earth hydroxides, for example, sodium hydroxide, potassium hydroxide and calcium hydroxide, or organic tertiary nitrogen bases, for example, trialkylamines, for example, trimethylamine and triethylamine, or pyridine. It is also possible to employ an excess of the compound of the formula III, especially if $R_4$ in a compound of the formula III is not a hydrogen atom. The reaction is advantageously carried out at elevated temperature and/or in the presence of an inert solvent, for example, a solvent with polar functional groups, for example, dimethylformamide, dimethylacetamide, dimethylsulphoxide, acetonitrile or cyclic aliphatic ethers, for example, dioxane and tetrahydrofuran.

In this process, it should further be noted that depending on the reaction conditions and on the working up, compounds may be obtained in which $R_4$ represents a 2-imidazolyl group, for example, the group

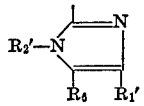

wherein $R_1'$, $R_2'$ and $R_6$ have the above meaning or in which $R_4$ represents a hydrogen atom, a lower alkyl, lower alkyl-sulphonyl-lower alkyl or amino-lower alkyl group. Depending on whether an excess of unsubstituted or substituted imidazole or an excess of unsubstituted or substituted imidazolidinone is employed, the yields of the unsubstituted or substituted di-[imidazolyl-(2)]-2-oxo-tetrahydromidazole obtained are increased or reduced.

In resulting compounds, substituents can be introduced, modified or split off, within the framework of the definition of the final substances.

Thus it is possible in a resulting compound in which $R_2$ and/or $R_2'$ is a hydrogen atom to introduce a radical $R_2$ or $R_2'$, different from hydrogen, in a manner which is in itself known. The introduction can in particular be effecetd by reaction of the resulting compound of the formula I with a compound $R_2X$, wherein $R_2$ has the above meaning but is different from hydrogen and X is a reactively esterified hydroxyl group, for example, one of those mentioned, especially a holagen atom, for example, a chlorine atom or a benzenesulphonyl group. In particular, a di-lower alkyl sulphate, for example, dimethyl sulphate, is also suitable for the alkylation. If it is intended to introduce a 1-hydroxyl-lower alkyl radical, for example, the hydroxymethyl radical $R_2$ or $R_2'$, the resulting compound of the formula I can also be reacted with an oxo-lower alkane, for example, with formaldehyde in order to introduce a hydroxymethyl group. If a 2-hydroxyl-lower alkyl radical, for example, the 2-hydroxyethyl radical, $R_2$ is to be introduced, the resulting compound can also be reacted with a 1,2-epoxy-lower alkane, for example, with ethylene oxide in order to introduce 2-hydroxyethyl. The reaction is preferably carried out in a neutral or weakly acid medium.

In a resulting compound in which $R_2$ or $R_2'$ is a hydroxy-lower alkyl group, $R_2$ or $R_2'$ can be converted into a lower alkoxy-lower alkyl radical in the usual manner. Thus, for example, a resulting hydroxy-lower alkyl compound can be reacted with a reactive ester, for example, one of those mentioned above, of a lower alkanol, preferably in the presence of a basic condensation agent, for example, one of those mentioned, for example, an alkali metal hydroxide, or can be reacted with a diazo-lower alkane, such as diazomethane.

In a resulting compound in which $R_3$ is a thioxo group, $R_3$ can be converted into the oxo group in the customary manner, especially in accordance with methods of hydrolysis which are in themselves known, for example, by treating the resulting thioxo compound with an alkaline agent, for example, an alkali metal hydroxide, in the presence of an oxidising agent, for example, hydrogen peroxide.

In a resulting compound in which $R_3$ is an oxo group, $R_3$ can be converted into the thioxo group in the usual manner, especially by treating the resulting oxo compound with a suitable sulphide, for example, phosphorus pentasulphide, aluminium sulphide, silicon disulphide or boron sulphide.

In a resulting compound in which $R_4$ is a hydrogen atom, a radical $R_4$ different from hydrogen can be introduced in the usual manner, for example, as described for the introduction of a radical $R_2$ different from hydrogen.

Thus, for example, a resulting compound of the formula

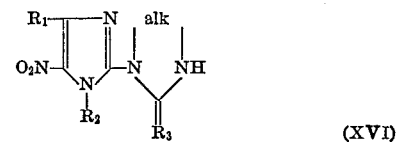

(XVI)

wherein $R_1$, $R_2$, $R_3$ and alk have the above meaning, can be reacted with a 2-X-imidazole, for example, a compound of the formula

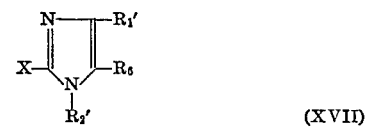

(XVII)

wherein $R_1'$, $R_2'$, and $R_6$ have the above meaning and X is a reactive esterified hydroxyl group, a reactive esterified hydroxyl group, a free or etherified mercapto group, an ammonium group or a sulphonyl group.

A reactive esterified hydroxyl group, a reactive etherified hydroxyl group, a free or etherified mercapto group, an ammonium group and a sulphonyl group are such groups as have been described above.

The reaction can be carried out in the usual manner. Preferably, the same conditions are used as those which have been described for the reaction of compounds of the formula II with compounds of the formula III.

Resulting compounds in which $R_4$ is a hydrogen atom can be acylated in the usual manner, especially by reaction with an acylating agent. Possible acylating agents are carboxylic acids, preferably in the form of their functional derivatives, for example, halides, especially chlorides, or anhydrides, for example, pure or mixed anhydrides, or internal anhydrides, for example, ketenes, or esters, for example, esters with lower alkanols, for example, methanol or ethanol, or cyanomethyl esters.

In a resulting compound in which $R_4$ is an acyl group, $R_4$ can be replaced by hydrogen in the usual manner. Thus an acylamino compound can be hydrolysed, preferably under acid catalysis, for example, with hydrochloric acid or sulphuric acid.

The subsequent transformations can be carried out individually or in combination and in optional sequence. Care must be taken in the individual operations that other functional groups are not attacked.

The invention also relates to those embodiments of a process in which a process is stopped at any stage or in which the starting material is a compound obtainable as an intermediate product at any stage and the missing steps are carried out, or in which a starting substance is formed under the reaction conditions or is used, if relevant, in the form of a salt and/or racemate or optical antipode.

The starting substances are known or can, if they are new, be obtained in accordance with methods which are in themselves known for the production of analogous compounds. New starting substances also form a subject of the invention.

Amongst the new starting substances, the invention in particular relates to imidazoles of the formula VII

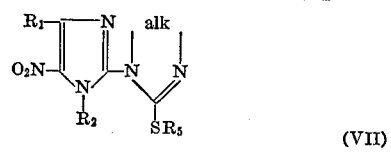

(VII)

wherein $R_1$, $R_2$, $R_5$ and alk have the above meaning.

These imidazoles possess valuable pharmacological properties. Thus they show, in particular, actions against bacteria, especially Gram-negative bacteria, protozoa and worms, for example, trichomonades, schistosomes, coccidia and particularly amoebea, as is shown in animal experiments, for example, from the liver of healthy hamsters artificially infected with *Entamoeba histolytica,* on administration of doses of from about 30 to about 100 mg./kg. given orally. The imidazoles of the invention are therefore in particular used as agents against amoebea, schistosomes, filaria, trichomonades and bacteria.

Amongst imidazoles of the formula VII, there should especially be singled out those wherein $R_1$ is a hydrogen atom or a lower alkyl group, $R_2$ is a lower alkyl or hydroxy-lower alkyl group, $R_5$ is a lower alkyl group and alk is a 1,2-ethylene, 1,2-propylene, 2,3-butylene or 2-methyl-1,2-propylene group.

Amongst the imidazoles of the formula VII, there should especially be singled out those wherein $R_1$ is a hydrogen atom, $R_2$ is a lower alkyl group, $R_5$ is a lower alkyl group and alk is a 1,2-ethylene group, for example, 1-[1 - methyl - 5 - nitro-imidazolyl-(2)]-methylmercapto-2-imidazoline, which produces a distinct freedom from abscess on the liver of healthy hamsters artificially infected with *Entamoeba histolytica,* on administration of doses of from 30 to 100 mg./kg. given orally.

The imidazoles of the formula VII are obtained in accordance with methods which are in themselves known for the production of analogous compounds.

Thus, the imidazoles of the formula VII can be obtained if an imidazole of the formula XII

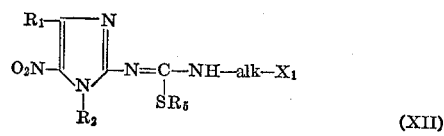

(XII)

wherein $R_1$, $R_2$, $R_5$ and alk have the above meaning and $X_1$ is a reactive esterified hydroxyl group as defined above, is intramolecularly cyclised. The reaction is preferably carried out under the conditions described above for cyclisation reactions.

In resulting imidazoles of the formula VII, substituents can be introduced, modified or split off within the framework of the definition of the final substances, especially as described above.

The invention also relates to those embodiments of the process for the manufacture of the imidazoles of the formula VII in which the process is stopped at any stage or in which the starting material is a compound obtainable as an intermediate product at any stage and the missing steps are carried out, or in which a starting substance is formed under the reaction conditions or, if relevant, used in the form of a salt and/or racemate or optical antipode.

The reactions mentioned are carried out in the usual manner, in the presence or absence of diluents, condensation agents and/or catalytic agents, at lowered, ordinary or elevated temperature, and optionally in a closed vessel. If appropriate, they are carried out at high dilution (dilution principle).

Depending on the process conditions and starting substances, the final substances are obtained in the free form or in the form of their acid addition salts, which is also encompassed by the invention. Thus, for example, basic, neutral or mixed salts, and if relevant also hemihydrates, monohydrates, sesquihydrates or polyhydrates thereof can be obtained. An acid addition salt of the compounds of the invention can be converted into the free compound in a manner which is in itself known, for example, by means of a basic agent, for example, an alkali or ion exchanger. On the other hand, a resulting free base can form a salt with an organic or inorganic acid.

To manufacture acid addition salts, those acids are in particular used which are suitable for forming physiologically tolerable salts. As examples of such acids there may be mentioned: hydrohalic acids, sulphuric acid, phosphoric acids, nitric acid, perchloric acid, aliphatic, alicyclic, aromatic or heterocyclic carboxylic or sulphonic acids, such as formic, acetic, propionic, succinic, glycollic, lactic, malic, tartaric, citric, ascorbic, maleic, hydroxymaleic or pyruvic acid; phenylacetic, benzoic, *p*-aminobenzoic, anthranilic, *p*-hydroxybenzoic, salicylic or p-aminosalicylic acid, embonic acid, methanesulphonic, ethanesulphonic, hydroxyethanesulphonic, and ethylenesulphoric acid; halogenobenzenesulphonic, toluenesulphonic, naphthalenesulphonic acid or sulphanilic acid; methionine, tryptophane, lysine or arginine.

These or other salts of the compounds of the invention, for example, the picrates, can also serve for the purification of a resulting free base, by converting the free base into a salt, isolating this and again liberating the base from the salt. Because of the close relationships between the compounds of the invention in the free form and in the form of their salts, the free compounds are to be understood, in the preceding and following text, where appropriate also to include the corresponding salts, as regards general sense and intended use.

Depending on the number of the asymmetrical carbon atoms and on the choice of the starting substances and procedures, the compounds of the invention can be in the form of racemate mixtures, racemates or optical antipodes.

A racemate mixture can be separated into the pure racemates in a known manner on the basis of the physicochemical differences of the constituents, for example, by chromatography and/or fractional crystallisation.

A pure racemate can be resolved in accordance with known methods, for example, by recrystallisation from an optically active solvent, with the aid of micro-organisms, or by reaction with an optically active acid which forms salts with the racemic compound and separation of the salts obtained in this manner, for example, on the basis of their differing solubilities, into the diastereomers, from which the antipodes can be liberated by the action of suitable agents. Particularly customary optically active acids are, for example, the D- and L-forms of tartaric acid, di-*o*-toluyltartaric acid, malic acid, mandelic acid, camphorsulphonic acid or quinic acid. Advantageously, the more active of the two antipodes is isolated.

According to the invention it is, however, also possible to obtain the end products in the form of the pure racemates or optical antipodes by employing starting substances containing one or more asymmetrical carbon atoms in the form of the pure racemates or optical antipodes.

The compounds of the invention can be employed, for example, in the form of pharmaceutical preparations in which they are present in the free form or, if relevant, in the form of their physiologically tolerable salts, in admixture or conjunction with a pharmaceutically suitable organic or inorganic, solid or liquid carrier suitable for enteral or parenteral administration. Suitable substances for forming the carrier are those which do not react with the compounds of the invention, for example, water, gelatine, lactose, starch, stearyl alcohol, magnesium stearate, talc, vegetable oils, benzyl alcohols, gum, propylene glycols, white petroleum jelly or other known pharmaceutical carriers. The pharmaceutical preparations can, for example, be in the form of tablets, dragées, capsules or suppositories or in, a liquid form, as solutions, for example, as an elixir or syrup, suspensions or emulsions. They may be sterilised and/or contain auxiliaries for example, preservatives, stabilisers, wetting agents or emulsifiers, solubilising agents or salts for regulating the osmotic pressure or buffers. They can also contain other pharmaceutically useful substances. The pharmaceutical preparations are formulated in accordance with customary methods. The dosage of the compounds of the invention can vary depending on the compound and on the individual requirements of the patient.

The compounds of the invention can also be used in veterinary medicine, for example, in one of the abovementioned forms or in the form of feedstuffs or of additives to animal fodder. Herein the customary extenders and diluents or feedstuffs are used, for example.

The following Examples illustrate the invention.

EXAMPLE 1

A solution of 37.0 g. of 1-acetyl-2-imidazolidinone in 300 ml. of dimethylformamide is added dropwise over the course of 15 minutes to a suspension of 13.9 g. of 50% strength sodium hydride in 150 ml. of dimethylformamide at approx. 50° C., whilst stirring. Thereafter, 59.3 g. of 1 - methyl - 2 - methylsulphonyl - 5 - nitro - imidazole dissolved in 250 ml. of dimethylformamide are added and the mixture is stirred for a further hour at 100° C.

After cooling, the reaction mixture is clarified by filtration using diatomaceous earth, and the filtrate is evaporated. The evaporation residue is dissolved in 500 ml. of ethylene chloride and is extracted by shaking with five 100 ml. portions of water. The ethylene chloride extract is dried with anhydrous magnesium sulphate and filtered and the filtrate is evaporated. The residue which remains is chromatographed on 1.5 kg. of silica gel. Chloroform is used for elution and fractions of 750 to 1,000 ml. are collected. Fractions 13 to 33 are combined and evaporated. The product obtained as a residue is triturated with 50 ml. of methanol and filtered off, and the residue is washed with methanol and dried. After recrystallisation from 30 ml. of 2 - ethoxyethanol, 1 - acetyl-2-oxo - 3 - [1 - methyl - 5 - nitro - imidazolyl - (2)] - tetrahydroimidazole of the formula

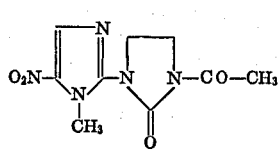

of melting point 157–158° C. is obtained.

If the residue remaining before the abovementioned chromatography is triturated with 100 ml. of chloroform, filtered off and recrystallised from 80 ml. of acetonitrile, 1,3 - di - [1 - methyl - 5 - nitro - imidazolyl - (2)] - 2-oxo-tetrahydroimidazole of the formula

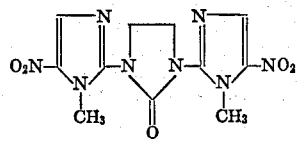

of melting point 211–212° C. is obtained. The mother liquor obtained on trituration with chloroform can then be evaporated and the resulting residue chromatographed as described above. In this case the combined fractions 38–47 after recrystallisation from 125 ml. of acetonitrile contain further 1,3 - di - [1 - methyl - 5 - nitro - imidazolyl - (2)] - 2 - oxo - tetrahydroimidazole of melting point 211–212° C.

EXAMPLE 2

13.9 g. of 1 - acetyl - 2 - oxo - 3 - [1 - methyl - 5-nitroimidazolyl - (2)] - tetrahydroimidazole and 300 ml. of 2 N sulphuric acid are heated under reflux for 1 hour. Thereafter the reaction mixture is cooled with ice and approx. 60 ml. of 10 N sodium hydroxide solution are added in portions whilst cooling with ice. The reaction mixture which has become alkaline is subsequently adjusted to pH 4–5 with a few ml. of glacial acetic acid. The yellow product which crystallises out is filtered off, washed with water and dried. 2 - Oxo - 3 - [1 - methyl-5 - nitro - imidazolyl - (2)] - tetrahydroimidazole of the formula

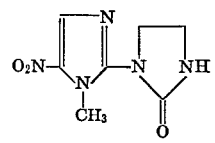

of melting point 203–205° C. (slight decomposition) is thus obtained.

EXAMPLE 3

A solution of 28.8 g. of 1 - acetyl - imidazolidine - 2-thione in 180 ml. of dimethylformamide is added dropwise over the course of one hour to a suspension of 9.6 g. of 50% strength sodium hydride in 120 ml. of dimethyl formamide and approx. 50° C. Thereafter the reaction mixture is stirred for one hour at approx. 50° C. and 41.0 g. of 1 - methyl - 2 - methylsulphonyl - 5 - nitroimidazole dissolved in 180 ml. of dimethylformamide are then added dropwise over the course of 15 minutes, and the whole is stirred for a further hour at 100° C. The reaction mixture is evaporated, the evaporation residue is dissolved in 400 ml. of ethylene chloride and the solution is extracted with five 75 ml. portions of water. The ethylene chloride extract is dried with anhydrous magnesium sulphate and filtered, and the filtrate is evaporated. The residue which remains is triturated with 60 ml. of methanol, filtered off and first recrystallised from 150 ml. and then from 100 ml. of acetonitrile. After again recrystallising from 40 ml. of 2 - methoxyethanol, 1 - acetyl-2-thioxo - 3 - [1 - methyl - 5 - nitro - imidazolyl - (2)]-tetrahydroimidazole of the formula

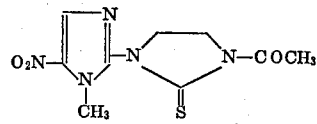

of melting point 183–184° C., with decomposition, is obtained.

EXAMPLE 4

A solution of 4.3 g. of ethyleneurea in 60 ml. of dimethylformamide is added dropwise over the course of 20 minutes to a suspension of 2.4 g. of 50% strength sodium hydride in 30 ml. of dimethylformamide at approx. 50° C., whilst stirring. Thereafter, 10.3 g. of 1- methyl - 2 - methylsulphonyl - 5 - nitroimidazole dissolved in 40 ml. of dimethylformamide are added and the mixture is subsequently stirred at 100° C. for a further hour.

After cooling, the reaction mixture is clarified by filtration using diatomaceous earth and the filtrate is evaporated. The evaporation residue is dissolved in 100 ml. of ethylene chloride and extracted by shaking with five 30 ml. portions of water. The ethylene chloride extract is dried with anhydrous magnesium sulphate, filtered and evaporated. The residue which remains is chromatographed on 300 g. of silica gel. Elution is carried out with chloroform. The fractions of $R_f$-value=0.25 (system: chloroform - methanol, 9:1) are combined and recrystallised from 40 ml. of acetonitrile. 1,3-Di-[1-methyl-5-nitro-imidazolyl-(2)] - 2 - oxo - tetrahydroimidazole of the formula

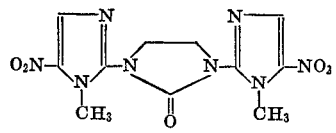

of melting point 211–212° C. is obtained.

EXAMPLE 5

A solution of 21.1 g. of 2 - oxo - 3-[1-methyl-5-nitro-imidazolyl-(2)]-tetrahydroimidazole in 200 ml. of dimethylformamide is added dropwise over the course of 30 minutes to a suspension of 4.8 g. of 50% strength sodium hydride in 50 ml. of dimethylformamide at approx. 50° C. whilst stirring. Thereafter, 20.5 g. of 1-methyl-2-methylsulphonyl - 5 - nitro-imidazole dissolved in 100 ml. of dimethylformamide are added and the mixture is then stirred at 100° C. for a further hour. The reaction mixture is subsequently evaporated, the evaporation residue is dissolved in 500 ml. of ethylene chloride and the solution is extracted by shaking with five 100 ml. portions of water. The ethylene chloride extract is dried with anhydrous magnesium sulphate and filtered, and the filtrate is evaporated. The residue which remains is chromatographed on 500 g. of silica gel. Elution is carried out with chloroform. The fractions of $R_f$-value=0.1 (system: chloroform-acetone, 4:1) are combined and recrystallized from 95 ml. of acetonitrile. 1,3 - Di - [1-methyl-5-nitro-imidazolyl-(2)]-2-oxo-tetrahydroimidazole of the formula

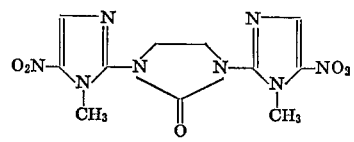

of melting point 211–212° C. is thus obtained.

EXAMPLE 6

Tablets containing 250 mg. of active substance are prepared in the usual manner, for example having the following composition per tablet:

| Composition: | Mg. |
|---|---|
| 2 - Oxo - 3 - [1-methyl-5-nitro-imidazolyl-(2)]-tetrahydroimidazole | 250 |
| Lactose | 36 |
| Wheat starch | 100 |
| Colloidal silica | 16 |
| Talc | 16 |
| Magnesium stearate | 2 |
| | 420 |

Preparation: 2 - Oxo - 2 - [1-methyl-5-nitro-imidazolyl-(2)] - tetrahydroimidazole is mixed with the lactose, a part of the wheat starch and with colloidal silica, and the mixture is forced through a sieve, whereby a powder mixture is obtained. A further part of the wheat starch is worked into a paste with a 5-fold amount of water on a water bath and the powder mixture is kneaded with this paste until a slightly plastic mass has been produced.

The plastic mass is pressed through a sieve of approx. 3 mm. mesh width and dried, and the dry granules are again forced through a sieve. Thereafter the remaining wheat starch, talc and magnesium stearate are mixed and the resulting mixture is pressed to give tablets, weighing 420 mg. (having a breaking groove).

EXAMPLE 7

Tablets containing 250 mg. of active substance are prepared in the usual manner, for example having the following composition per tablet:

| Composition: | Mg. |
|---|---|
| 1,3 - Di - [1-methyl-5-nitro-imidazolyl-(2)]-2-oxo-tetrahydroimidazole | 250 |
| Lactose | 36 |
| Wheat starch | 100 |
| Colloidal silica | 16 |
| Talc | 16 |
| Magnesium stearate | 2 |
| | 420 |

Preparation: 1,3-Di-[1-methyl-5-nitro-imidazolyl-(2)]-2-oxo-tetrahydroimidazole is mixed with the lactose, a part of the wheat starch and with colloidal silica, and the mixture is forced through a sieve, whereby a powder mixture is obtained. A further part of the wheat starch is worked into a paste with a 5-fold amount of water on a water bath and the powder mixture is kneaded with this paste until a slightly plastic mass has been produced.

The plastic mass is pressed through a sieve of approx. 3 mm. mesh width and dried, and the dry granules are again forced through a sieve. Thereafter the remaining wheat starch, talc and magnesium stearate are mixed and the resulting mixture is pressed to give tablets, weighing 420 mg. (having a breaking groove).

EXAMPLE 8

An amount of 0.42 g. of 2-oxo-3-[1-methyl-5-nitroimidazolyl-(2)]-tetrahydroimidazole is refluxed with 10 ml. of formic acid and 3.5 ml. of acetic acid anhydride for 10 hours. The reaction mixture is subsequently concentrated by evaporation to dryness, and the slightly viscous evaporation residue dried overnight on an earthenware slab. Recrystallisation is performed twice from a small amount of 2-ethoxyethanol to obtain pure 1-formyl-2-oxo-3-[1-methyl-5-nitroimidazolyl-(2)] - tetrahydroimidazole of the formula

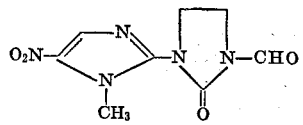

which melts at 181–182°.

EXAMPLE 9

An amount of 1.5 g. of 2-oxo-3-[1-methyl-5-nitroimidazolyl-(2)]-tetrahydroimidazole is heated with 20 ml. of propionic acid anhydride for 1 hour to boiling. The reaction mixture is subsequently concentrated in a rotary evaporator to dryness, and the evaporation residue recrystallised from 12 ml. of isopropanol to obtain 1-propionyl-2-oxo-3 - [1-methyl-5-nitroimidazolyl-(2)] - tetrahydroimidazole of the formula:

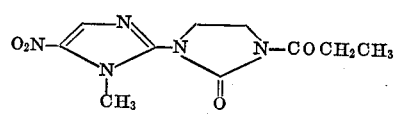

which melts at 144–145°.

The following can be produced in an analogous manner to that described in the preceding examples:

1-trimethylacetyl-2-oxo-3-[1-methyl-5-nitroimidazolyl-(2)]-tetrahydroimidazole,
1-methyl-2-oxo-3-[1-methyl-5-nitroimidazolyl-(2)]-tetrahydroimidazole,
1-hydroxymethyl-2-oxo-3-[1-methyl-5-nitroimidazolyl-(2)]-tetrohydroimidazole, and
1-(2-hydroxyethyl)-2-oxo-3-[1-methyl-5-nitroimidazolyl-(2)]-tetrahydroimidazole.

What is claimed is:

1. An imidazole of the formula I

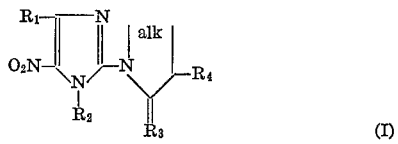

(I)

wherein $R_1$ is hydrogen or lower alkyl, $R_2$ is lower alkyl or hydroxy-lower alkyl, $R_3$ is oxo or thioxo, $R_4$ is hydrogen, lower alkyl, lower alkanoyl or the group

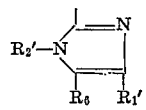

wherein $R_1'$ and $R_2'$ are the same as $R_1$ and $R_2$ respectively and $R_6$ is nitro and alk is 1,2-ethylene, 1,2-propylene, 2,3-butylene or 2-methyl-1,2-propylene, or a physiologically tolerable salt thereof.

2. An imidazole of the formula I as claimed in claim 1, wherein $R_1$ is hydrogen or lower alkyl, $R_2$ is lower alkyl or hydroxy-lower alkyl, $R_3$ is oxo, $R_4$ is hydrogen, lower alkyl or lower alkanoyl and alk is 1,2-ethylene, 1,2-propylene, 2,3-butylene or 2-methyl-1,2-propylene.

3. An imidazole of the formula I as claimed in claim 1, wherein $R_1$ is hydrogen, $R_2$ is lower alkyl, $R_3$ is oxo, $R_4$ is hydrogen or lower alkanoyl and alk is 1,2-ethylene.

4. An imidazole of the formula I

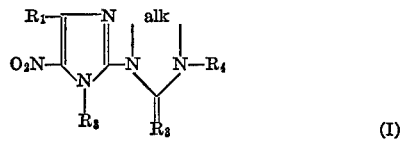

(I)

wherein $R_1$ is hydrogen or lower alkyl, $R_2$ is lower alkyl or hydroxy-lower alkyl, $R_3$ is oxo, $R_4$ is hydrogen or lower alkyl or lower alkanoyl or the group

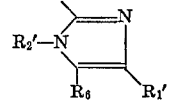

wherein $R_1'$ is hydrogen or lower alkyl, $R_2'$ is lower alkyl or hydroxy-lower alkyl, $R_6$ is nitro and alk is 1,2-ethylene, 1,2-propylene, 2,3-butylene or 2-methyl-1,2-propylene or a physiologically tolerable salt thereof.

5. 1-Acetyl-2-oxo-3-[1-methyl-5-nitroimidazolyl-(2)] - tetrahydroimidazole or its physiologically tolerable salt.

6. 2-Oxo-3-[1-methyl-5-nitro-imidazolyl-(2)] - tetrahydroimidazole or its physiologically tolerable salt.

7. 1-Acetyl - 2-thioxo - 3-[1-methyl-5-nitro-imidazolyl - (2)]-tetrahydroimidazole or its physiologically tolerable salt.

8. 1,3-Di[1-methyl-5-nitro-imidazolyl-(2)] - 2-oxo-tetrahydroimidazole or its physiologically tolerable salt.

9. 1-Formyl-2-oxo-3-[1-methyl-5-nitro-imidazolyl-(2)]-tetrahydroimidazole or its physiologically tolerable salt.

10. 1-Propionyl-2-oxo-3-[1-methyl-5-nitro-imidazolyl - (2)]-tetrahydroimidazole or its physiologically tolerable salt.

References Cited

UNITED STATES PATENTS

| 3,642,836 | 2/1972 | Cusic et al. | 260—309 |
| 3,728,355 | 4/1973 | D'Amico et al. | 260—309.7 |

FOREIGN PATENTS

| 4,613 | 11/1966 | France. |
| 7,528 | 12/1969 | France. |

OTHER REFERENCES

Ciba, Chem. Abst., vol. 70, No. 28917y (1969).
Lecher et al., Chem. Abst., vol. 48, columns 3264–3266 (1954).
Merck, Chem. Abst., vol. 64, columns 2093–2094 (1966).

NATALIE TROUSOF, Primary Examiner

U.S. Cl. X.R.

260—243 B, 247.1 247.2 A, 256.4 C, 256.5 R, 268 H, 293.7, 309, 309.6; 424—246, 248, 250, 251, 267, 273

UNITED STATES PATENT OFFICE
CERTIFICATE OF CORRECTION

PATENT NO. : 3,832,352
DATED : August 27, 1974
INVENTOR(S) : Atso Ilvespää

It is certified that error appears in the above-identified patent and that said Letters Patent are hereby corrected as shown below:

Column 13, right-hand portion of formula of claim 1 should be

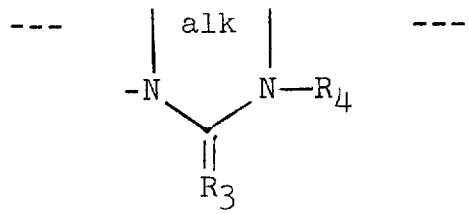

Signed and Sealed this ninth Day of September 1975

[SEAL]

Attest:

RUTH C. MASON  
*Attesting Officer*

C. MARSHALL DANN  
*Commissioner of Patents and Trademarks*